UNITED STATES PATENT OFFICE.

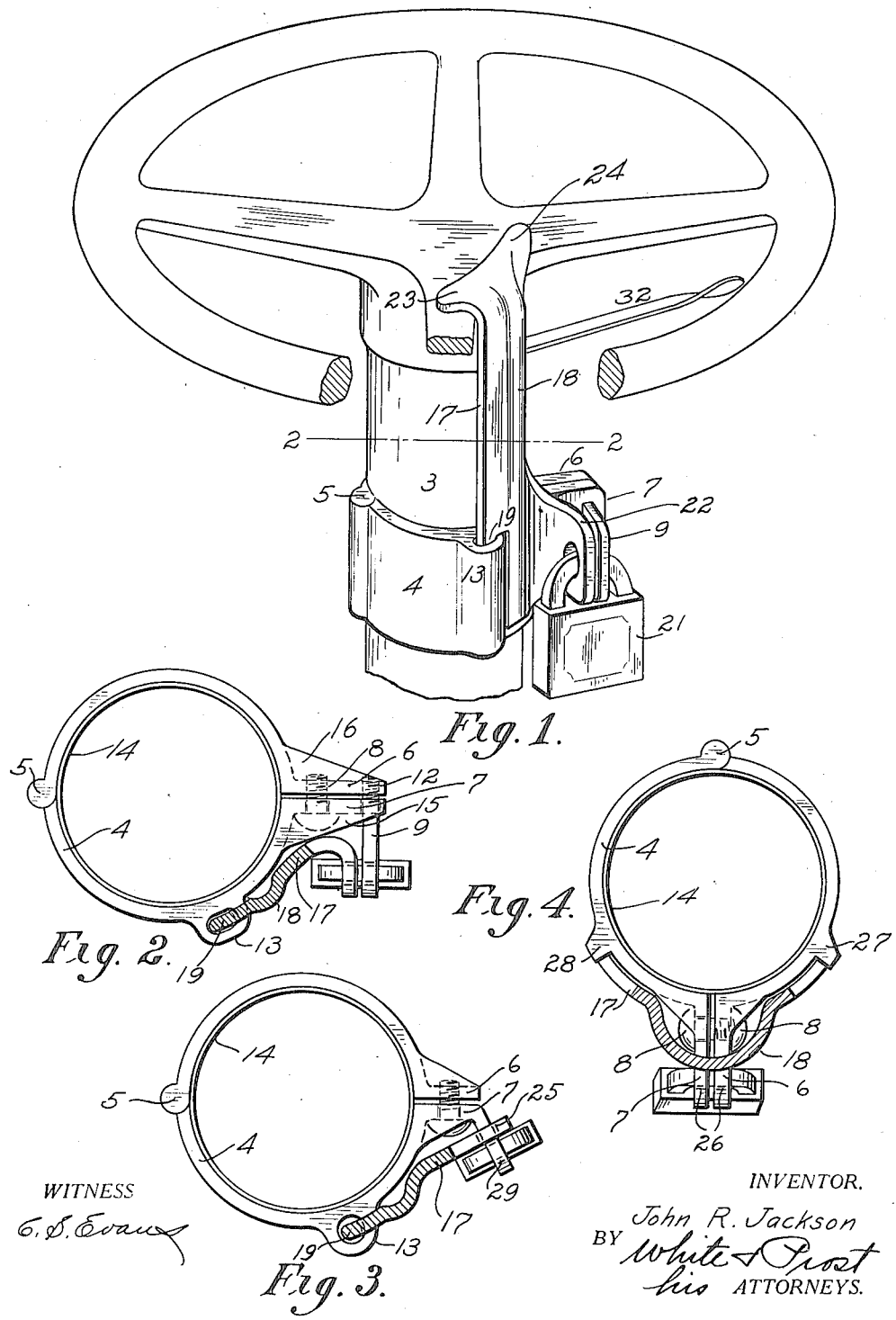

JOHN R. JACKSON, OF SAN FRANCISCO, CALIFORNIA.

AUTOMOBILE-LOCK.

1,197,937.    Specification of Letters Patent.    Patented Sept. 12, 1916.

Application filed July 17, 1915. Serial No. 40,501.

*To all whom it may concern:*

Be it known that I, JOHN R. JACKSON, a citizen of the United States, and a resident of the city and county of San Francisco, State of California, have invented a new and useful Automobile-Lock, of which the following is a specification.

The invention relates to an automobile lock with which the steering wheel of the automobile is rendered inoperable.

An object of the invention is to provide means for locking the steering wheel of an automobile against rotation, and at the same time blocking the movement of the fuel control lever.

A further object of the invention is to provide an automobile lock of simple construction which is easy to apply and remove and which effectively prevents the operation of the automobile when in place.

The invention possesses other advantageous features, which, with the foregoing, will be set forth at length in the following description, where I shall fully explain that preferred form of my invention which is illustrated in the drawings accompanying and forming part of the specification. The novelty of the invention will be included in the claims succeeding said description. From this it is apparent that I do not limit myself to the showing made by the said drawings and description, as I may adopt many variations within the scope of my invention as set forth in the said claims.

Referring to the drawings: Figure 1 is a perspective view of my invention applied to an automobile steering post, part of the wheel being broken away. Fig. 2 is a sectional view taken on the line 2—2 of Fig. 1. Fig. 3 and Fig. 4 are sectional views of two modifications of my invention, the line of section being the same as that for Fig. 2.

The steering post 3 is encircled by a ring or band 4 made in two parts which are hinged or otherwise secured together at 5. The parts are formed with outstanding wings 6 and 7, through which one or more screws 8 may be passed to clamp the ring firmly to the post. An additional fastening is given by the hasp 9 formed with an aperture in one end and having a threaded projection 12 which is screwed into the wing 6 seating the member tightly against the wing 7. Formed on that side of the ring from which the hasp 9 extends and suitably spaced therefrom, is an apertured lug 13.

Seated in the lug 13 and projecting upward therefrom to engage the spokes of the steering wheel, is a removable block 17, which when in position prevents rotation of the wheel and blocks the turning of the fuel control lever 32. The block is formed with a longitudinal stiffening rib 18 and is positioned in front of the screws 8 to prevent interference with them when the block is in place. The lower portion of the block is cut away to form a pin 19 which fits loosely into the hole in the lug 13 so that it may be easily dropped into place or removed. The side opposite the pin 19 is extended outwardly beyond the body of the block to form a wing 22 having an aperture which will register with the aperture in the hasp 9.

The upper portion of the block 17 is formed with two flaring curved fingers 23 and 24 adapted to engage two adjacent spokes of the steering wheel when the block is placed in the clamp ring, thus preventing the steering wheel from being turned or removed. By slipping a padlock 21 through the registered apertures in the block and hasp, the block is locked into the clamp ring and the operation of the steering wheel prevented. To remove the lock from the wheel, the padlock is unlocked and removed. The block is then readily disengaged from the clamp, leaving the wheel free to be turned, or the lever 32 to be moved forward to supply fuel to the engine. It is contemplated that before applying the block 17, the steering wheel would preferably be turned to direct the front wheels of the automobile sharply to the side.

A lining 14 of leather or other suitable material may be inserted between the clamp ring and the steering post and the ring may be ribbed as at 15 and 16 to give additional strength.

In the construction shown in Fig. 3, the wing on the lower portion of the block is provided with a slot 25 through which one of the wings of the clamp ring projects when the block is swung into position. The padlock is then passed through an aperture 29 in the clamp wing to secure all in place.

In the construction shown in Fig. 4, both of the projecting wings of the clamp ring serve as the hasp and are, therefore, apertured at 26 for the padlock. The block is symmetrical at its lower end and is provided with a centrally placed longitudinal slot through which the wings of the clamp ring project. The center rib 18 of the block 17 is enlarged adjacent the wings to provide space for the heads of the fastening screws 8 arranged on opposite sides of the wings, one above the other. Vertically disposed lugs 27 and 28 may be formed integral with the clamp ring to give additional support to the block 17.

I claim:

1. In combination with the steering post of an automobile, a clamp ring adapted to be secured to the steering post and having an apertured lug thereon, a hasp arranged on said clamp ring, a removable block adapted to be seated in said lug and having an apertured wing in alinement with said hasp, and means passing through said wing and hasp for locking the block into the said clamp ring.

2. In combination with the steering wheel and steering post of an automobile, a clamp ring adapted to be secured to the steering post and having thereon a hasp, a block adapted to be placed in engagement with said wheel and clamp ring, and removable means engaging said hasp for locking the block in engagement with the wheel and clamp ring.

3. In combination with the steering post of an automobile, a clamp ring adapted to be secured to said post and having thereon a hasp, a block adapted to engage said clamp ring to intercept the movement of the fuel control lever, and removable locking means adapted to engage said hasp for preventing the removal of the block from the said clamp ring.

In testimony whereof, I have hereunto set my hand at San Francisco, California, this 6th day of July 1915.

JOHN R. JACKSON.